United States Patent
Lansford et al.

[11] Patent Number: 6,163,568
[45] Date of Patent: Dec. 19, 2000

[54] BROADBAND, LOW POWER FM/FSK TRANSCEIVER FOR WIRELESS COMMUNICATIONS SYSTEMS

[75] Inventors: James Lansford, Hillsboro, Oreg.; Stephen M. Ernst, Colorado Springs, Colo.

[73] Assignee: Simtek Corporation, Colorado Springs, Colo.

[21] Appl. No.: 09/051,952

[22] PCT Filed: Oct. 23, 1995

[86] PCT No.: PCT/US95/14443

§ 371 Date: Sep. 8, 1998

§ 102(e) Date: Sep. 8, 1998

[87] PCT Pub. No.: WO97/16012

PCT Pub. Date: May 1, 1997

[51] Int. Cl.[7] ....................................................... H04B 1/38

[52] U.S. Cl. .............................. 375/219; 375/272; 455/78

[58] Field of Search ..................................... 375/272, 219, 375/222, 211, 223, 215; 455/73, 78, 82

[56] References Cited

U.S. PATENT DOCUMENTS

| | | |
|---|---|---|
| 3,158,810 | 11/1964 | Stone, Jr. . |
| 4,012,597 | 3/1977 | Lynk, Jr. et al. . |
| 4,052,672 | 10/1977 | Victor . |
| 4,449,250 | 5/1984 | Kurby . |
| 4,520,474 | 5/1985 | Vilmue . |
| 4,817,192 | 3/1989 | Phillips . |
| 5,065,408 | 11/1991 | Gillig . |
| 5,345,473 | 9/1994 | Berg . |
| 5,428,824 | 6/1995 | Kasai . |
| 5,825,813 | 10/1998 | Na ............................................ 375/219 |

*Primary Examiner*—Stephen Chin
*Assistant Examiner*—Dac V. Ha
*Attorney, Agent, or Firm*—Gerald E. Lester

[57] ABSTRACT

An FM/FSK Transceiver for a wireless communications interface is disclosed which employs an offset phase lock loop which is accelerated into phase lock by a sweep signal to avoid data degradation, and which includes a feed forward compensation to accommodate a broadband response from DC to above 10 MHz in the exchange of information between computers, computers and peripheral equipments, and between peripheral equipments.

15 Claims, 3 Drawing Sheets

BROADBAND, LOW POWER FM/FSK TRANSCEIVER FOR WIRELESS COMMUNICATIONS SYSTEMS

FIELD OF THE INVENTION

The invention relates in general to a transceiver for a wireless communications interface that is used in exchanging information between computers, between computers and peripheral equipments, and between peripheral equipments, and more particularly to an FM/FSK transceiver having a feedforward design for extending the bandwidth of an offset phase locked loop to accommodate broadband transmission with reduced power consumption in a wireless communications interface.

BACKGROUND OF THE INVENTION

In a wireless communications interface as may be used in Desktop Area Networks, where communication is desired with a computer or a peripheral device, between computers, or between a computer and a peripheral device located in an office or between adjacent offices, broadband transceivers are needed to achieve high data transmission rates. As such wireless communications interfaces are battery powered for maximum transportability, it is desirable to prolong the life of the battery to ensure a reasonable duration of use. This may be accomplished through reduced power consumption.

It further is commercially desirable to avoid the necessity of obtaining a license from the Federal Communication Commission (FCC) in order to operate a wireless communications interface. One way to achieve this goal is to design the transceiver to operate within exempted frequency bands without exceeding the power limits designated by the FCC. The exempted frequency bands include the Industrial, Scientific and Medical (ISM) frequency bands nominally at 27 MHz, 900 MHz, 2.4 GHz, and 5.7 GHz.

A still further constraint on the design of a transceiver for wireless communications interfaces is manufacturing cost. It is a well known historical fact that the lower the frequency of operation, the lower the cost of the hardware comprising the transceiver.

Prior systems attempting to satisfy the above constraints have failed because they have not been able to achieve in combination both an acceptable level of frequency stability in a reasonably short time, and a broad enough bandwidth to achieve desired data rates without exceeding FCC power limits within the exempted frequency bands described above. One reason for such failure is the use of either programmable phase lock loops or phase lock loops that require frequency dividers as described in U.S. Pat. Nos. 4,052,672; 4,602,225; 4,679,005; 5,027,429; 5,079,526; and 5, 374,903. Dividers consume excessive amounts of power. Another reason for such failure is that even when a phase lock loop without dividers as described in U.S. Pat. No. 4,118,673 is used, there has been an inability to achieve either a phase lock that is fast enough to avoid data degredation at the 900 MHz data rates of the present invention, or an extension of transceiver bandwidth down to DC for FSK modulated carrier signals.

While DC frequency modulation as described in U.S. Pat. Nos. 4,602,225 and 5,079,526 has been achieved, upper frequency limitations have prevented the bandwidths necessary for desired data rates of the order of 100 Kilobits per second and higher.

In accordance with the invention, a transceiver is provided with an offset phase locked loop which has no power consuming frequency dividers, and which is swept into a fast lock by varying bias levels in transistors that comprise a phase detecting component of the loop. In addition, components within the phase lock loop which have functionalities that are required for both transmitting and receiving are shared to avoid unnecessary power consumption. Further, a feed forward compensation method is used to achieve bandwidths from DC to above 10 MHz, and to provide additional aid in achieving a fast phase lock.

SUMMARY OF THE INVENTION

The invention is a broadband, low power transceiver for a wireless communications system, which supports 906 MHz +/−50 KHz transmission and reception, and which controls power consumption through the use of a dual tripler effect (instead of a conventional synthesizer circuit with frequency dividers) to create a crystal controlled reference frequency that is used in both the transmit and receive modes. The reference frequency is mixed with the transmit or receive signal to form an Intermediate Frequency (IF) which is compared by a phase detector with the output frequency of a primary voltage controlled oscillator (VCO). The primary VCO output has a nominal center frequency which is equal to the IF output of the mixer, and which is frequency shift keyed (FSK) to convey the information to be transmitted. The phase detector output is an error voltage which is applied to a transmitter VCO. The transmitter VCO responds to the error signal to provide an FSK modulated transmission signal which causes the mixer output to lock in phase with the primary VCO. The net effect is to lock the transmitter VCO to a stable local oscillator (the primary VCO) that can be FSK modulated.

In one aspect of the invention, the phase lock loop is an offset phase lock loop with a feed forward compensation that accommodates a broadband response from D.C. to above 10 MHz In another aspect of the invention, a sweep signal is applied to vary bias levels in the transistors comprising the phase detector of the phase lock loop to speed the loop into a lock mode.

In still another aspect of the invention, a number of functional devices comprising the offset phase lock loop are shared between transmit and receive modes, and high-gain-bandwidth transistors requiring low bias currents are used in the crystal oscillator, tripler, mixer, preamp/filter and power amplifier of the loop to further reduce power consumption.

DESCRIPTION OF PREFERRED EMBODIMENTS

Figure 1:
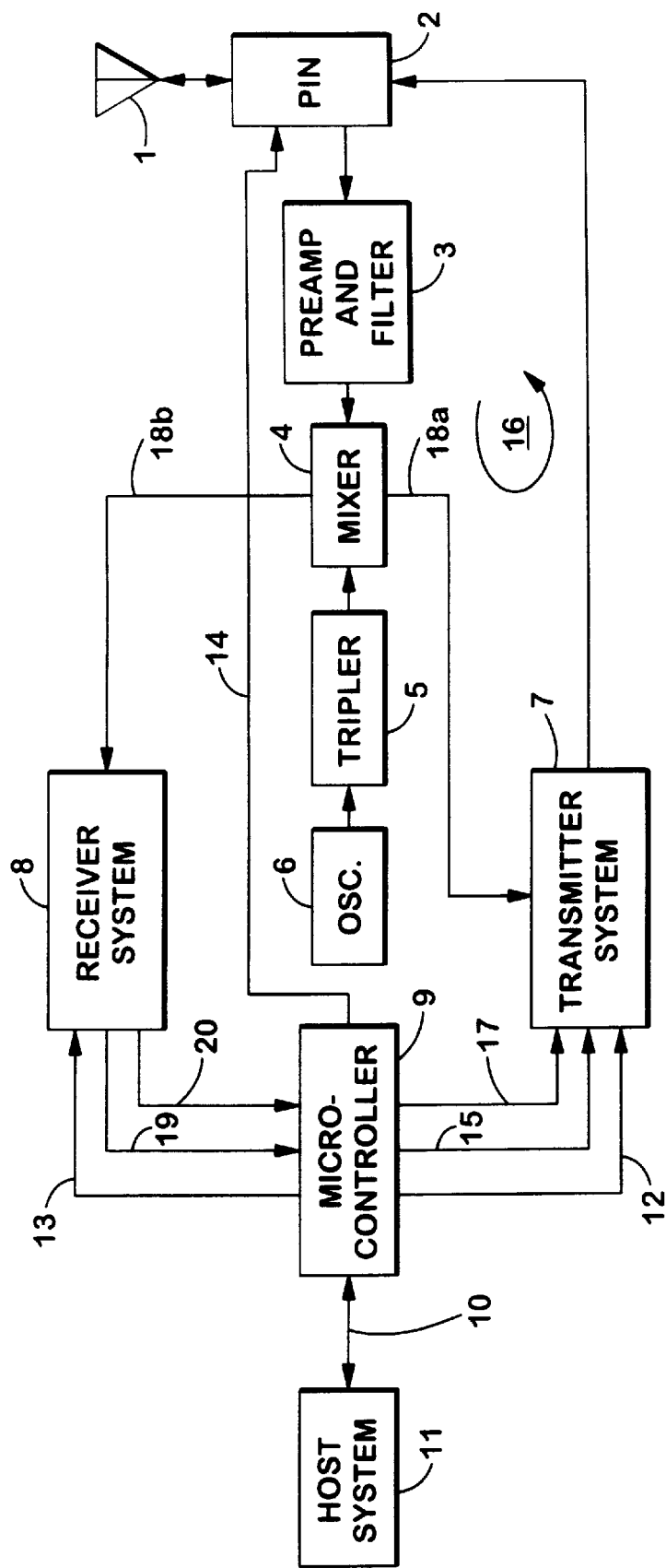
FIG. 1 is a functional block diagram of a wireless communications interface which is plugged into a parallel port of a host system.

Referring to FIG. 1, a wireless communications interface is illustrated which is comprised of an RF antenna system 1 for receiving and transmitting signals in a frequency range of 906 MHz +/−50 KHz, a PIN TlR switch 2, a preamp/filter 3, a mixer 4, a frequency tripler 5, a 101.856 MHz crystal oscillator system 6, a transmitter system 7, a receiver system 8, a microcontroller 9, a parallel port 10, and a host system 11 which may be either a computer or a peripheral device such as a printer. The antenna system 1, switch 2, preamp/filter 3, mixer 4, tripler 5, oscillator system 6, transmitter system 7 and receiver system 8 comprise a transceiver in which the present invention is embodied. Oscillator system 6 is a standard Colpitts crystal oscillator that generates a 101.856 MHz frequency at −27 dBm as measured by a 50Ω shunt probe. The tripler 5 is of a well known design in the art that employs a Class A amplifier that provides approximately 8 dB of gain. The input of the amplifier is an LC tank circuit (L=33 nH, C=20 pF) which filters the 305.568 MHz harmonic of the oscillator 6 output. The amplifier is operated in the non-linear region to generate third order harmonics at 916.7 MHz, which is filtered by a pi network consisting of a quarter wave stub and two 22 pF capacitors. The preamp/filter 3 is of a well-known single transistor Class A type design that consists of an RF preamplifier providing approximately 6 dB of gain over a 40 MHz bandwidth centered at 906 MHz, and a 2 MHz bandwidth output filter centered at 906.5 MHz.

In accordance with one aspect of the invention, in order to reeduce power consumption, the crystal oscillator system 6, tripler 5, mixer 4, preamp/filter 3, and an output power amplifier (to be further described in connection with the description of FIG. 2) in the transmitter system 7 are comprised of high-gain bandwidth transistors requiring low bias currents.

In operation, the crystal oscillator system 6 supplies a third harmonic (305.568 MHz) of the fundamental 101.856 MHz frequency to the tripler 5, which in turn generates a third harmonic of the 305.568 MHz signal to yield a crystal controlled reference frequency of 916.7 MHz. The reference frequency is common to both the receiver system 8 and the transmitter system 7.

For a transmission to occur, the host system 11 issues a transmit request to the controller 9. In response, the controller 9 issues a transmit enable signal on line 12 to energize the transmitter system 7, and a deactivation signal on line 13 to turn the receiver system off. In addition, the controller 9 issues a control signal on line 14 to switch 2 to place the antenna system 1 in transmit mode.

PIN switch 2 is a DC controlled PIN RF switch consisting of two HSMP3820 pin diodes (commercially available from Hewlett Packard in Palo Alto, Calif.) and a 10 KΩ bias resistor, with the diodes being separated by a quarter wave PC board trace stub to form an SPDT RF switch.

The antenna system 1, which is of a conventional design well known in the art, is a printed circuit board trace of copper foil on an FR4 (epoxy fiberglass) substrate that has been tuned to resonate at approximately 906 MHz. The active copper foil element used in the antenna is about 2.5 inches long with a rectangle of copper foil at one end that acts as a load. The loading allows the antenna to radiate efficiently as a loaded quarter wave element at 906 MHz. The feed end of the antenna is connected to the printed circuit board ground plane, and the load end of the antenna is placed about 0.50 inches from the ground plane. So constructed, the antenna exhibits a 3 dB bandwidth of at least 40 MHz, and an impedance of approximately 34 ohms.

Transmission data is received by the microcontroller 9 from the host system 11 by way of parallel port 10. The controller in turn supplies the transmission data along line 15 to the transmitter system 7, where the data is encoded on a carrier by means of frequency shift keying modulation.

The FM/FSK modulated carrier is locked to a stable local oscillator by means of the phase lock loop 16, which is comprised of the transmitter system 7, switch 2, preamp/filter 3 and mixer 4. The modulated carrier is sent by the transmitter system 7 through the switch 2 to the antenna system 1, where it is broadcast to a receiving system of another wireless communications interface.

The mixer 4 is a single transistor, single ended, unbalanced mixer which is biased to provide 3 dB of gain. The mixer produces an Intermediate Frequency (IF) signal which is the difference between the output of the transmitter system 7 (906 MHz +/−50 KHz) and the reference frequency provided at the output of the tripler 5 (916.7 MHz). This 10.7 MHz IF signal is applied through an LC filter (L=5.6 µH, C=0.027 µF) internal to the mixer 4 to remove harmonics and other spurious signals, and along line 18a to one input of the transmitter system 7. The IF signal is compared with the output of a local oscillator in the transmitter system 7 to produce a signal to drive the 906 MHz transmitter output, as shall be further explained in connection with the description of FIG. 2. In order to increase the speed at which a frequency lock will occur between the local oscillator and the transmitter system output, the microcontroller 9 issues a sweep signal on line 17 to the transmitter system 7 as also will be explained in more detail below.

When the wireless communications interface is not in transmit mode as requested by the host system 11, it is in the receive mode where switch 2 isolates the output of the transmitter system 7 from the antenna system 1 in response to a control signal issued by the microcontroller 9 on line 14. In addition, the line 12 becomes inactive and line 13 is activated by the controller to energize the receiver system The antenna system 1 will receive a signal with a nominal center frequency of 906 Mhz, which is applied to the mixer 4 to create an IF frequency equal to the difference between the 916.7 MHz reference frequency supplied by the tripler 5 and the received signal. The 10.7 MHz IF frequency is applied along line 18b to the receiver system 8, which is a commercially available superheterodyne frequency modulation (FM) receiver IC chip, order number MC13158, from Motorola Semiconductor in Phoenix, Ariz. The IF frequency is demodulated by the receiver to produce a baseband analog signal, which in turn is applied by the receiver to an adaptive threshold detector (not shown) to determine whether a valid transmission has been received. Upon a valid transmission signal being detected, a signal detect flag is issued by the receiver system on line 19 to microcontroller 9. In response to the signal detect signal, the microcontroller 9 reads the demodulated transmission data on line 20, and supplies such information to the host system 11 by way of parallel port 10.

Figure 2:
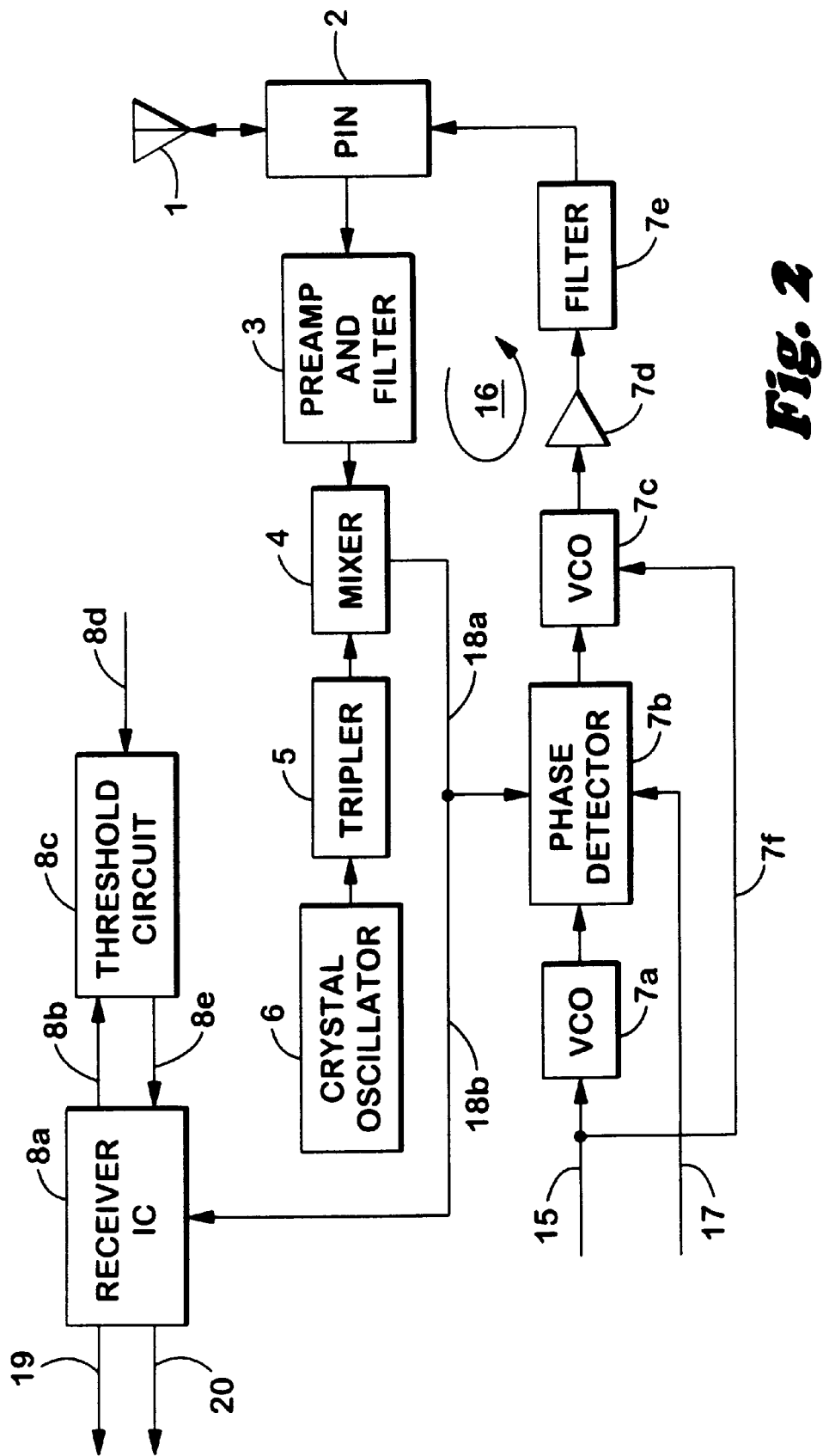
FIG. 2 is a functional block diagram of a broadband FM/FSK transceiver in accordance with the invention which is used in the wireless communications interface of FIG. 1.
Figure 3:
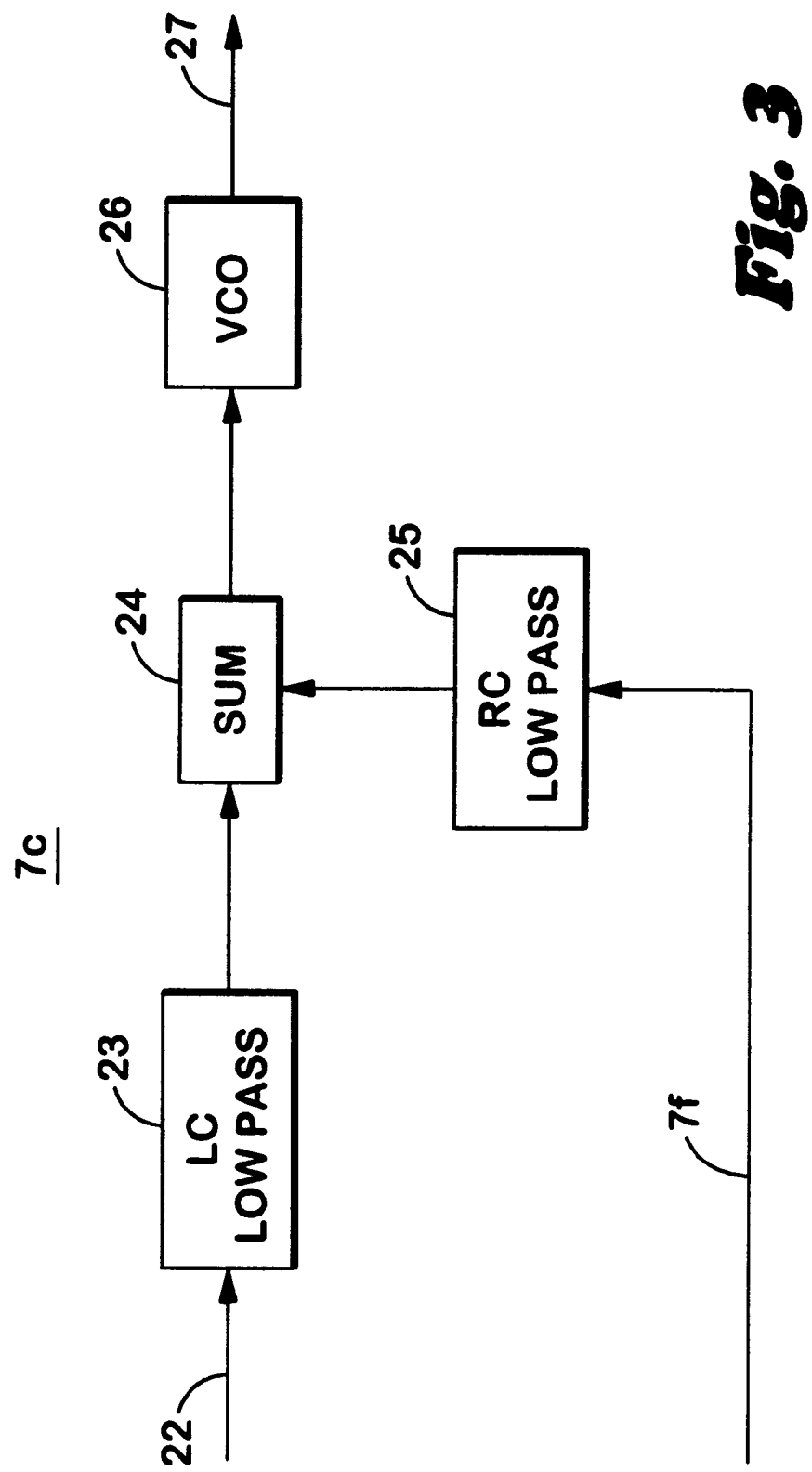
FIG. 3 is a functional block diagram of the application of feedforward compensation to the VCO 7c of FIG. 2.

FIG. 2 is a detailed block diagram of the system of FIG. 1 which more dramatically illustrates the innovations in the transceiver invention. In the description which follows, like reference numbers will refer to like devices as illustrated in FIGS. 1, 2 and 3.

As before described, when the transmission of a signal is requested by the host system 11, the microcontroller 9 enables the transmitter system 7, disables the receiver system 8, and causes the switch 2 to couple the output of the transmitter system 7 to the antenna 1. In FIG. 2, the transmitter system is comprised of a 10.7 MHz voltage controlled oscillator (VCO) 7a, a phase detector 7b, a 906 MHz VCO 7c, a power amplifier 7d which boosts the output of the VCO 7c to approximately 0 dBm, and a final transmit bandpass filter 7e which removes harmonics and other spurious signals from the output of the power amplifier. The final effective radiated power is −1.25 dBm.

VCO 7a is a 10.7 MHz voltage-controlled Colpitts oscillator with a varactor to allow frequency modulation. The free running frequency of the VCO is determined by an LC tank circuit with an inductance of 2.2 $\mu$H, and a capacitance determined by the parallel combination of a 3–10 pF variable capacitor and a varactor diode with a nominal capacitance of 10 pF ( order no. 1200-04 from Alpha Semiconductor of Santa Clara, Calif.). VCO 7c is a 906 MHz, single transistor, Colpitts oscillator that can be phase locked to the crystal controlled reference frequency of 916.7 MHz at the output of tripler 5. The free running frequency of the oscillator is determined by a tank circuit consisting of a 10 pF nominal varactor diode (as identified above) and a 1–3 pF variable capacitor, each in parallel with a quarter wave stub. The output power of VCO 7c is nominally −16.5 dBm, measured incircuit with a 50$\Omega$ probe.

Phase detector 7b is a four transistor (two 2N3906 and two 2N918 transistors), double balanced mixer with a separate transistor (2N918) in the emitter stage in accordance with conventional design well known in the art. The phase detector has two balanced inputs and an input to the emitter stage transistor. The sweep signal on line 17 is applied to an RC low pass filter (R=560 K$\Omega$, C=100 pF) at one of the balanced inputs, and the 10.7 MHz IF output of mixer 4 is applied by way of line 18a to the other balanced input. The 10.7 MHz output of VCO 7a is applied to the emitter stage transistor to cause the two 10.7 Mhz signals to be multiplied together when the sweep input is set at a fixed amplitude. Power amplifier 7d provides about 10 dB of power gain into a 50 ohm load. Filter 7e is a standard pi network with two quarter wave stubs and a 22 pF capacitor, with a measured power output of −3.7 dBm across a 50 ohm shunt load.

Upon the transmitter system 7 being enabled, the information to be transmitted is applied on line 15 to the VCO 7a to cause an FSK modulation of the VCO output. More particularly, a 10.7 MHz calibrated nominal output of VCO 7a is pulled by microcontroller 9 to approximately 50 KHz higher or lower than the nominal frequency to effect an FSK modulation. The FSK modulated signal then is applied to phase detector 7b, where it is compared to the 10.7 MHz output of the mixer 4 to develop an error voltage to drive the VCO 7c. As the FSK modulated output of VCO 7a is applied to the phase detector, a sweep signal from the microcontroller 9 is issued to the phase detector to speed the phase lock loop 16 into a frequency lock by varying the bias levels in the high-gain bandwidth transistors used in the phase detector.

The sweep signal is controlled by the microcontroller 9 to cause the VCO 7c output to start at the upper limit of the phase lock range at approximately 907 MHz, and thereafter be frequency modulated downward from 907 MHz to 905 MHz. Due to the design of the phase lock loop 16, the loop quickly falls into lock with the 916.7 Mhz crystal controlled reference frequency of tripler 5. The speed of the phase lock is important because no transmission data can be clocked into the transmitter system 7 until a phase lock occurs.

The transmission data on line 15 also is applied by way of line 7f as a feedforward compensation input to the VCO 7c, where the feedforward signal is added with the error signal output of the phase detector 7b to quickly extend the bandwidth response of the phase lock loop. More particularly, a phase locked loop is ordinarily a closed loop system that depends on the characteristics of the loop filter and tramsmit VCO for its transient response. When the open loop signal on line 7f is applied in sum with the closed loop output of phase detector 7b to drive the VCO 7c during a phase lock process, the VCO 7c output can be pushed and pulled to its final value more quickly since the loop has a shorter frequency range to span. The combination of the open loop and closed loop signals allows the phase lock loop 16 to operate approximately twice as fast as the same loop without feedforwared compensation, and to extend the bandwidth of the phase lock loop above 10 MHz.

The maximum data rate that can be transmitted is a function of the bandwidth of the 906 MHz phase locked loop 16. Without feedforward compensation, the phase locked loop is adequate to transmit data at speeds of up to 200 Kilobits per second. When feedforward compensation is added to the phase locked loop, the bandwidth may be extended above 10 MHz.

FIG. 3 illustrates the application of feedforward compensation in more detail. Referring to FIG. 3, the output of phase detector 7b is applied by way of line 22 to the input of an LC lowpass filter 23 (a pi network of a 33 $\mu$H inductor and two 27 pF capacitors), the output of which is applied to the input of a summing circuit 24 (two 1000$\Omega$ resistors feeding a 1000 pF capacitor). Circuit 24 also receives the output of an RC lowpass filter 25 (R=1000$\Omega$, C=0.027 $\mu$F), which has as an input the transmission data signal of line 7f. The ouput of the circuit 24 is applied to the input of a voltage-controlled LC oscillator 26, which is identical to VCO 7c and whose 906 MHz +/−50 KHz output is applied by way of line 27 to the input of power amplifier 7d.

Referring again to FIG. 2, the phase lock loop 16 is comprised of phase detector 7b, the VCO 7c, the power amplifier 7d, filter 7e, PIN T/R switch 2, preamp/filter 3, and mixer 4. The 10.7 MHz output of mixer 4 is applied through a loop filter internal to the mixer, which is an IF image bandpass filter implemented as an LC tank filter (L=5.6 $\mu$H, C=0.027 $\mu$F) in the collector of the single transistor comprising the mixer. The output of the filter is supplied by way of line 18a to the phase detector 7b. which compares the 10.7 MHz IF signal on line 18a to the 10.7 MHz output of VCO 7a to generate an error voltage that drives the VCO 7c . In response to the error voltage, the VCO 7c causes the output of mixer 4 to lock in frequency to the 10.7 MHz output of VCO 7a.

The 906 MHz output of VCO 7c is boosted to approximately 0 dBm by the power amplifier 7d, and is filtered by the bandpass filter 7e to remove harmonics and other spurious signals. The output of the filter 7e is an FM/FSK modulated signal with a frequency of 906 MHz +/−50 Khz, which is applied through the PIN switch 2 to the antenna system 1 for transmission.

The transmission signal output of filter 7e also is applied by way of the PIN switch 2 to the preamp/filter 3, where it is attenuated by approximately 20 dB. The output of the preamp/filter in turn is applied to the mixer 4, which as before described produces a 10.7 MHz IF signal that is the difference between the 916.7 MHz reference signal at the output of the tripler 5 and the nominal 906 MHz transmission signal. The IF output of the mixer is filtered and applied to the phase detector 7b to close the phase lock loop 16, and to cause the transmission signal to be radiated at 906 MHz +/−50 KHz. The net effect of the phase lock loop is to lock the VCO 7c to a stable local oscillator (VCO 7a ) which can be varied by the microcontroller 9 by +/−50 KHz.

The above described transmission mode circuit can support a 906 MHz +/−50 KHz FM/FSK transmission and exhibit a broadband response that extends from the D.C. level to above 10 MHz.

In the receive mode, the microcontroller 9 activates the receiver IC chip 8a, and deactivates the transmitter system 7 including VCO 7a, phase detector 7b, VCO 7c, power amplifier 7d, and filter 7e. In addition, the microcontroller causes the PIN switch 2 to isolate the transmitter system 7 from the antenna system 1 and the preamp/filter 3.

When a signal with a nominal frequency of 906 MHz is received by the antenna system, the signal is amplified and filtered by the preamp/filter 3 to remove out-of-band image frequencies. The signal thereafter is applied to the mixer 4 to produce a 10.7 MHz IF frequency, which is the difference between the reference frequency of 916.7 MHz and the 906 MHz transmission signal received from the antenna system. The IF frequency so produced is applied to the receiver IC chip 8a, where it is demodulated to produce an analog baseband signal that is supplied by way of an internal shaping network to line 8b leading to an adaptive threshold circuit 8c.

The threshold circuit employs an adaptive threshold technique described as a Neyman-Pearson detector in "Principles of Communications", by R. E. Ziemer and W. H. Tranter, 3rd. edition, Houghton Mifflin, 1990. In accordance with the technique, the microcontroller 9 searches for a threshold value that causes a specified number of false packets per second, the "false alarm rate" threshold. The microcontroller then increases the threshold until the threshold crossing rate drops to a specified level, typically ten spurious packets per second. At this threshold, the transceiver's sensitivity to a desired signal is maximized for a given noise level. As the noise level changes, the microcontroller adapts the threshold to maintain the level of sensitivity.

The threshold circuit compares the analog signal on line 8b with a threshold level supplied by microcontroller 9 on line 8d to determine whether a valid transmission signal has been received. If so, line 8e is energized by the threshold circuit, and the receiver IC chip 8a in response thereto issues a signal detect signal on line 19. The microcontroller 9 upon receiving the signal detect signal reads the demodulated transmission signal on line 20.

From the above descriptions, it is clear that the transceiver system illustrated in FIG. 2 avoids excessive power consumption by: (1) sharing the crystal oscillator 6, tripler 5, mixer 4, and preamp/filter 3 with both the transmitter system 7 and the receiver system 8; (2) deactivating the receiver system during a transmission mode, and deactivating the transmitter system during a receive mode operation; (3) using high-gain, broadband, low bias current transistors in the crystal oscillator 6, tripler 5, mixer 4, preamp/filter 3 and power amplifier 7d to reduce power consumption; and (4) using a non-programmable, off-set phase lock loop which locks the output of the VCO 7c to the local oscillator VCO 7a output without any need for frequency dividers.

The transceiver of FIG. 2 further overcomes the problem of data degradation occurring as a result of the phase lock loop acting too slowly, by applying a sweep signal to the bias levels in the phase detector transistors to cause the loop to lock more quickly. The transmit VCO oscillator 7c thereby is quickly and efficiently locked to the stable local oscillator 7a, which the microcontroller 9 can vary by +/−50 KHz to cause a transmission to occur at 906 MHz +/−50 KHz.

Further, by modulating the 10.7 MHz offset frequency rather than the 906 MHz carrier frequency, a broadband response from the DC level may be provided. In addition, by using the transmission data signal to feedforward compensate the transmit VCO 7c in the phase lock loop 17, the broadband response may be extended above 10 Mhz. That is, the 906 Mhz VCO 7c will switch between +/−50 KHz much faster to accommodate high frequency data rates without degredation.

While preferred embodiments of the invention have been described and illustrated by way of example only, it should be apparent to those skilled in the art that the invention can be modified in arrangement and detail without departing from the spirit and scope of the following claims.

What is claimed is:

1. A low power transceiver system for a wireless communications interface having an antenna for receiving and radiating FSK modulated carrier signals, a switch system in electrical communication with said antenna for switching said antenna between a transmit mode and a receive mode, a microcontroller electrically controlling said switch system and having a parallel port for electrically communicating with a host system, which comprises:

reference frequency means for generating a reference signal having a frequency equal to a sum of a frequency of said FSK modulated carrier signals and an offset frequency;

preamp/filter means in electrical communication with said switch system for receiving and amplifying said FSK modulated carrier signals from said switch system, and for removing spurious signals from said FSK modulated carrier signals;

mixer means in electrical communication with said preamp/filter means and said reference frequency means during both said receive mode and said transmit mode, and receiving said reference signal from said reference frequency means and said FSK modulated carrier signals from said preamp/filter means for providing a first FSK modulated offset signal having a frequency equal to said offset frequency;

transmitter means in electrical communication with said microcontroller, said mixer means and said switch system during said transmit mode, and receiving a transmission data signal from said microcontroller for creating a second FSK modulated offset signal having a frequency equal to said offset frequency and for extending transceiver bandwidth through feedforward compensation, and receiving said first FSK modulated offset signal from said mixer means for comparing with said second FSK modulated offset signal to create a phase error signal and for generating a first of said FSK modulated carrier signals in response to said phase error signal, and receiving a sweep signal from said microcontroller for increasing speed at which said first of said FSK modulated carrier signals phase locks to said second FSK modulated offset signal and said first FSK modulated offset signal phase locks to said second FSK modulated offset signal; and receiver means in electrical communication with said microcontroller and said mixer means during said receive mode for signalling an occurrence of a second of said FSK modulated carrier signals to said microcontroller and for demodulating said first FSK modulated offset signal to send transmission data to said microcontroller for transmission through said parallel port to said host system.

2. The transceiver system of claim 1, wherein said transmitter means comprises:

a first VCO means in electrical communication with said microcontroller for generating said second FSK modulated offset signal;

phase detector means in electrical communication with said mixer means and said first VCO means for detecting phase differences between said first FSK modulated offset signal and said second FSK modulated offset signal and generating said phase error signal, and in electrical communication with said microcontroller for receiving said sweep signal to increase speed at which phase locks occur;

second VCO means in electrical communication with said phase detector means and driven by said phase error signal to generate said first FSK modulated carrier signal, and in electrical communication with said microcontroller for receiving said transmission data signal to feed forward compensate said phase error signal and thereby extend transceiver bandwidth;

a power amplifier in electrical communication with said second VCO means for boosting power levels of said FSK modulated carrier signals; and output filter means in electrical communication with said power amplifier and said switch system for removing harmonics and other spurious signals from said FSK modulated carrier signal for transmission by said antenna.

3. The transmitter means of claim 2, wherein said second VCO means comprises:

an LC lowpass filter in electrical communication with said phase detector means for eliminating harmonics and other spurious signals from said phase error signal;

an RC lowpass filter in electrical communication with said microcontroller for eliminating harmonics and other spurious signals from said transmission data signal;

summing means in electrical communication with said LC lowpass filter and said RC lowpass filter for generating a feedforward compensated phase error signal to extend transceiver bandwidth above DC; and a voltage controlled LC oscillator in electrical communication with said summing means and driven by said feedforward compensated phase error signal to generate said first of said FSK modulated carrier signals.

4. The transceiver system of claim 1, wherein said receiver means includes an adaptive threshold means for detecting an occurrence of said second of said FSK modulated carrier signals.

5. The transceiver system of claim 1, wherein said reference signal has a frequency of 916.7 MHz, said first FSK modulated offset signal and said second FSK modulated offset signal have a nominal frequency of 10.7 MHz, and said FSKmodulated carrier signals have a nominal frequency of 906 MHz.

6. The transceiver system of claim 1, wherein said second FSK modulated offset signal has a frequency of 10.7 MHz +/−50 KHz and said FSK modulated carrier signals have a frequency of 906 MHz +/−50 KHz.

7. The transceiver system of claim 1, wherein said switch system, said preamp/filter means, said mixer means, and said transmitter means form an offset phase lock loop having a bandwidth from DC to greater than 10 MHz.

8. The transceiver system of claim 1, wherein high-gain-bandwidth transistors requiring low bias currents are used in said reference frequency means, said mixer means, said preamp/filter means, and said transmitter means to further reduce power consumption.

9. A method for receiving and transmitting FSK modulated carrier signals in a low power transceiver for a wireless communications interface having an antenna for receiving and radiating said FSK modulated carrier signals, a microcontroller with a parallel port for electrical communication with a host system, and a switch system responsive to said microcontroller for switching said antenna into a receive mode or a transmit mode, which comprises the steps of:

filtering a third harmonic from a cyrstal controlled oscillator and tripling said third harmonic in a tripler in electrical communication with said crystal controlled oscillator to provide a stable reference signal having a frequency equal to a sum of a frequency of said FSK modulated carrier signals and an offset frequency;

filtering and amplifying said FSK modulated carrier signals in a preamp/filter system in electrical communication with said switch system;

mixing said FSK modulated carrier signals received from said preamp/filter system and said stable reference signal in a mixer in electrical communication with said preamp/filter system and said tripler to provide a first FSK modulated offset signal having said offset frequency;

generating a second FSK modulated offset signal having said offset frequency by applying a transmission data signal received from said microcontroller to a first VCO;

detecting a phase difference between said first FSK modulated offset signal and said second FSK modulated offset signal in a phase detector in electrical communication with said first VCO and said mixer to provide a phase error signal;

generating a first of said FSK modulated carrier signals by applying said phase error signal to a second VCO in electrical communication with said phase detector;

applying a sweep signal from said microcontroller to said phase detector to increase speed of locking said first FSK modulated offset signal to said second FSK modulated offset signal, and said first of said FSK modulated carrier signals to said second FSK modulated offset signal;

applying said transmission data signal from said microcontroller to said second VCO to feed forward compensate said phase error signal and thereby extend transceiver bandwidth above DC;

amplifying and filtering said first of said FSK modulated carrier signals in a series circuit comprised of a power amplifier in electrical communication with said second VCO and a filter in electrical communication with said switch system;

entering said transmit mode in response to a first control signal issued by said microcontroller to said switch system to allow said antenna to radiate said first of said FSK modulated carrier signals;

electrically isolating said first VCO, said phase detector, said second VCO, and said series circuit from said preamp/filter system and said antenna in response to a second control signal issued by said microcontroller to said switch system to enter said receive mode;

demodulating said first FSK modulated offset signal and detecting transmission data through adaptive thresholding in a receiver system in electrical communication with said microcontroller; and issuing transmission data detected in said receiver system to said microcontroller for transfer to said host system by way of said parallel port.

10. The method of claim 9, wherein said offset frequency is 10.7 MHz, said stable reference signal has a frequency of 916.7 MHz, and said FSK modulated carrier signals have a frequency of 906 MHz +/−50 KHz.

11. The method of claim 9, wherein the step of applying said transmission data signal from said microcontroller to said second VCO extends transceiver bandwidth above 10 MHz.

12. The method of claim 9, wherein said first FSK modulated offset siganl has a frequency of 10.7 MHz, said second FSK modulated offset signal has a frequency of 10.7 MHz +/−50 KHz, and said FSK modulated carrier signals have a frequency of 906 MHz +/−50 Khz.

13. The method of claim 9, wherein said switch system, said preamp/filter system, said mixer, said phase detector, said second VCO, and said series circuit form an offset phase lock loop having a bandwidth from DC to above 10 MHz.

14. The method of claim 9, wherein said crystal controlled oscillator, said tripler, said mixer, said preamp/filter system, and said power amplifier are comprised of high-gain-bandwidth transistors requiring low bias currents and thus low power consumption.

15. A low power transceiver system for receiving and transmitting FSK modulated carrier signals in a wireless communications interface of a Desktop Area Network, which comprises:

a crystal oscillator for generating a third harmonic of a stable fundamental frequency;

a tripler in electrical communication with said crystal oscillator for generating a stable reference signal having a frequency three times that of said third harmonic;

an antenna which is tuned to resonate at said FSK modulated carrier signals nominal frequency, and which receives said FSK modulated carrier signals when in a receive mode and radiates said FSK modulated carrier signals when in a transmit mode;

a PIN switch in electrical communication with said antenna for placing said antenna in said receive mode in response to a first control signal and in said transmit mode in response to a second control signal, and routing said FSK modulated carrier signals from and to said antenna;

a preamp/filter circuit in electrical communication with said PIN switch for removing harmonics and spurious signals from said FSK modulated carrier signals received from said PIN switch;

a mixer in electrical communication with said preamp/filter circuit and said tripler for mixing said stable reference signal and said FSK modulated carrier signals to generate a first FSK modulated offset signal having an offset frequency;

a microcontroller having a parallel port for communicating with a host system in said Desktop Area Network;

a first VCO in electrical communication with said microcontroller and responsive to a transmission data signal issued by said microcontroller to generate a second FSK modulated offset signal having said offset frequency;

a phase detector in electrical communication with said mixer and said first VCO, and receiving said first FSK modulated offset signal and said second FSK modulated offset signal to detect phase differences and create therefrom a phase error signal, and in electrical communication with said microcontroller and receiving a sweep signal issued by said microcontroller;

a second VCO in electrical communication with said phase detector and said microcontroller, and receiving said phase error signal and said transmission data signal to generate a feedforward compensated phase error signal as a drive signal in generating said FSK modulated carrier signals;

a power amplifier in electrical communication with said second VCO and receiving said FSK modulated carrier signals to boost power levels in said FSK modulated carrier signals for wireless transmission;

a transmit bandpass filter in electrical communication with said power amplifier and said PIN switch, and receiving said FSK modulated carrier signals from said power amplifier to remove harmonics and other spurious signals before said FSK modulated carrier signals are routed by said PIN switch both to said preamp/filter circuit to complete an offset phase lock loop and to said antenna for transmission when said antenna is in said transmit mode; and a receiver system in electrical communication with said mixer and said microcontroller for detecting an occurrence of said FSK modulated carrier signals through adaptive thresholding and upon detecting said occurrence demodulating said first FSK modulated offset signal to send transmission data to said microcontroller.

* * * * *